G. R. HENDERSON.
RADIAL TRUCK.
APPLICATION FILED JUNE 17, 1913.
1,104,667.
Patented July 21, 1914.
4 SHEETS—SHEET 4.
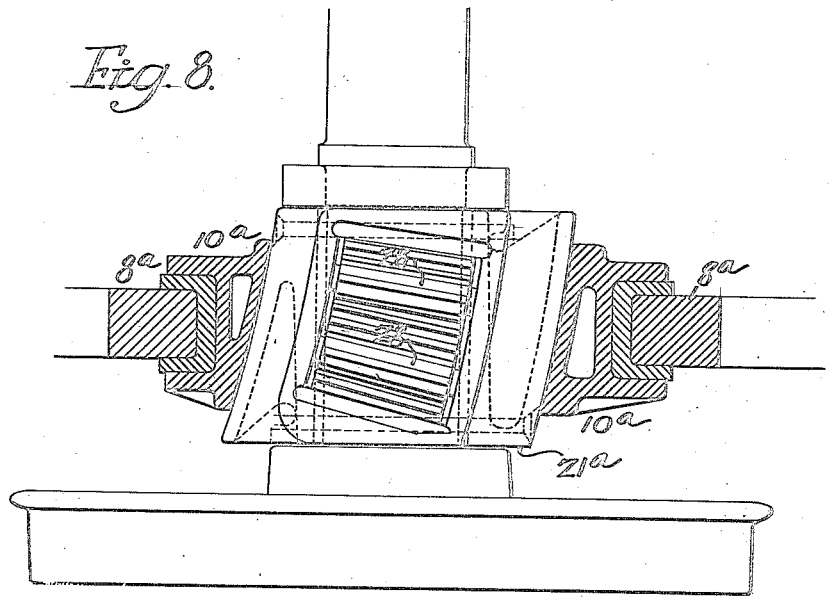
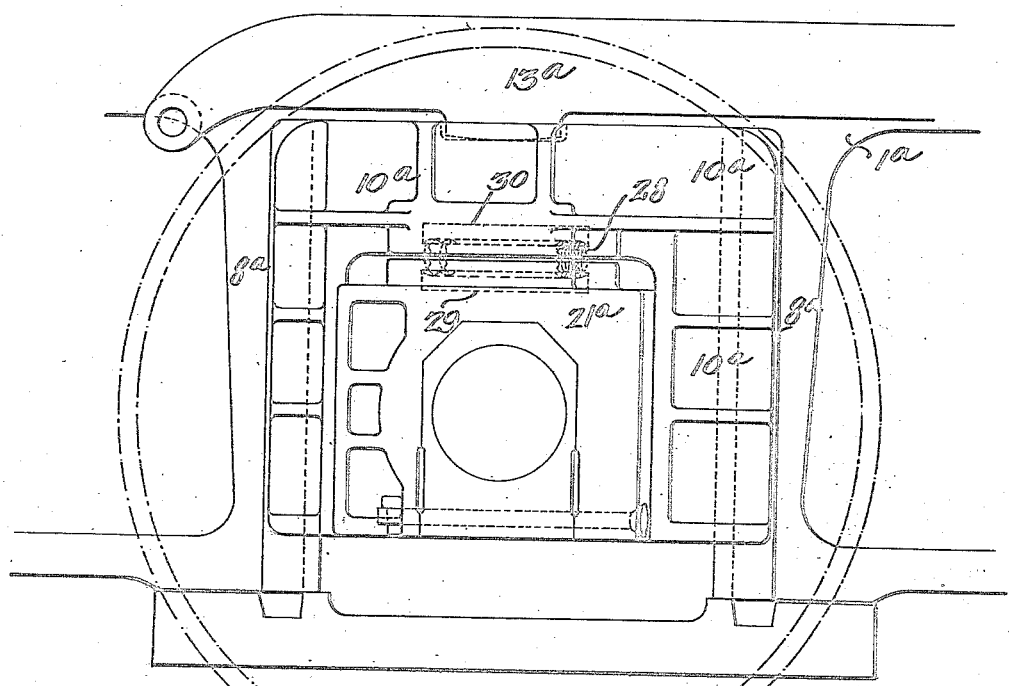

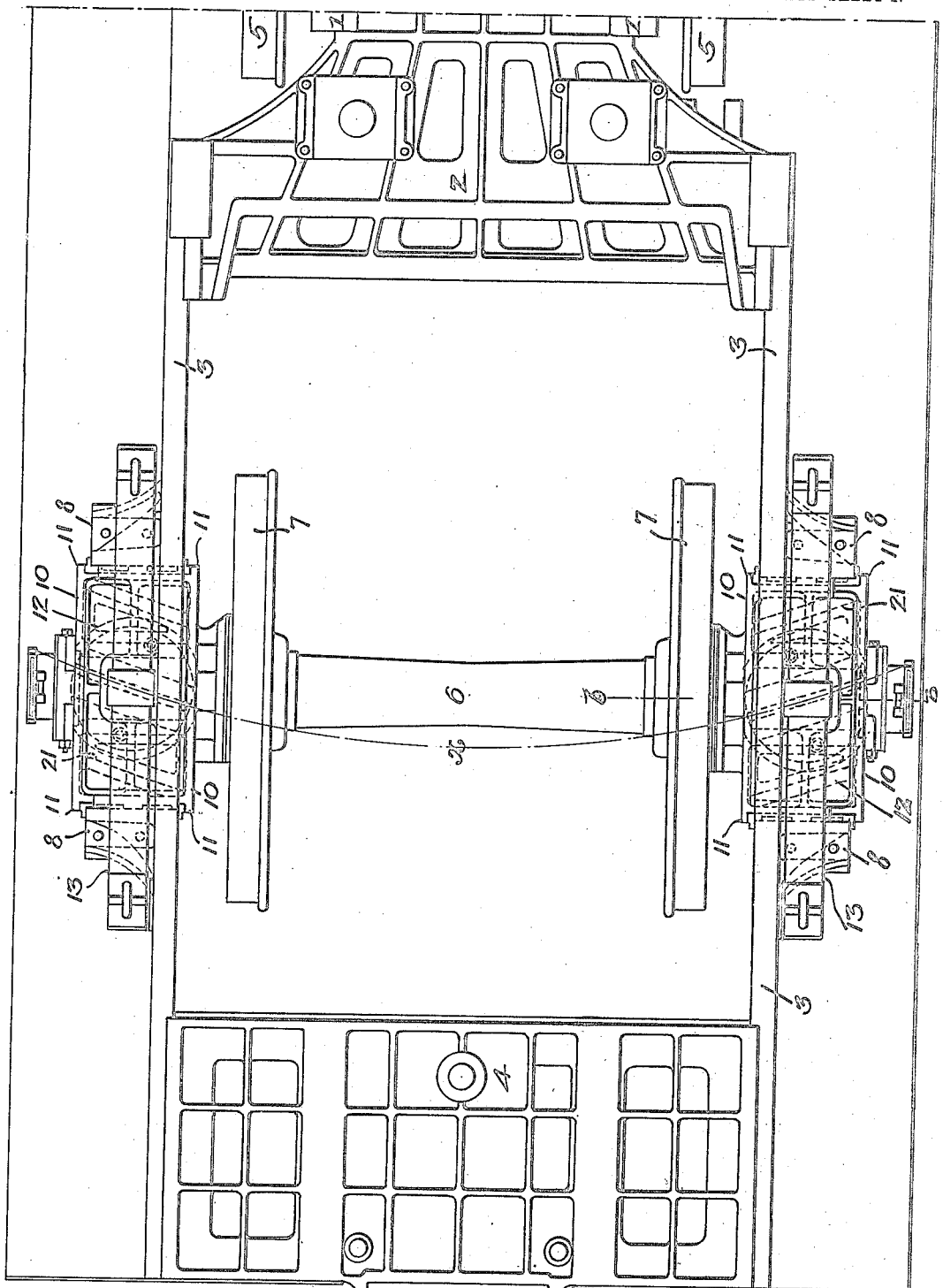

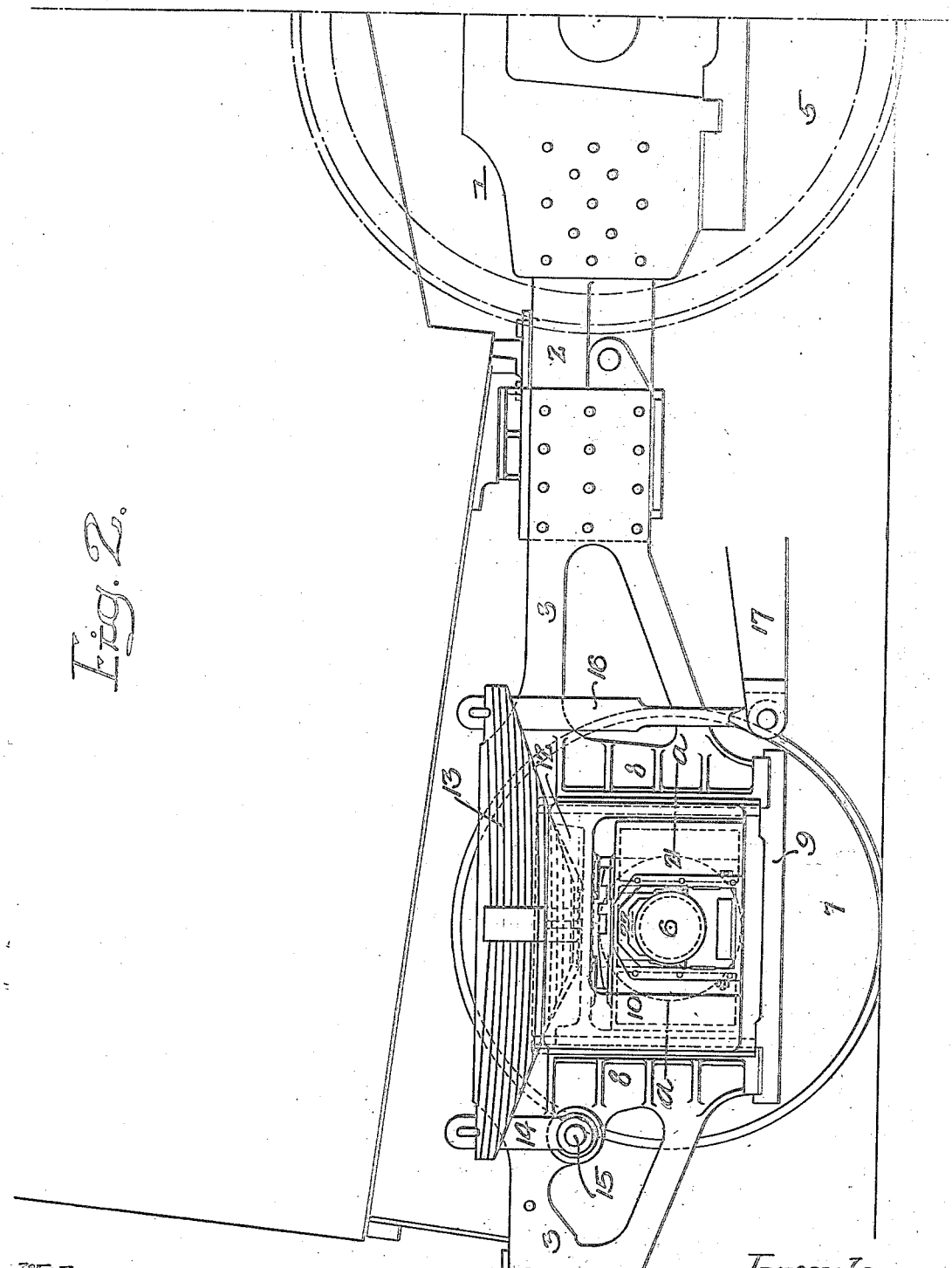

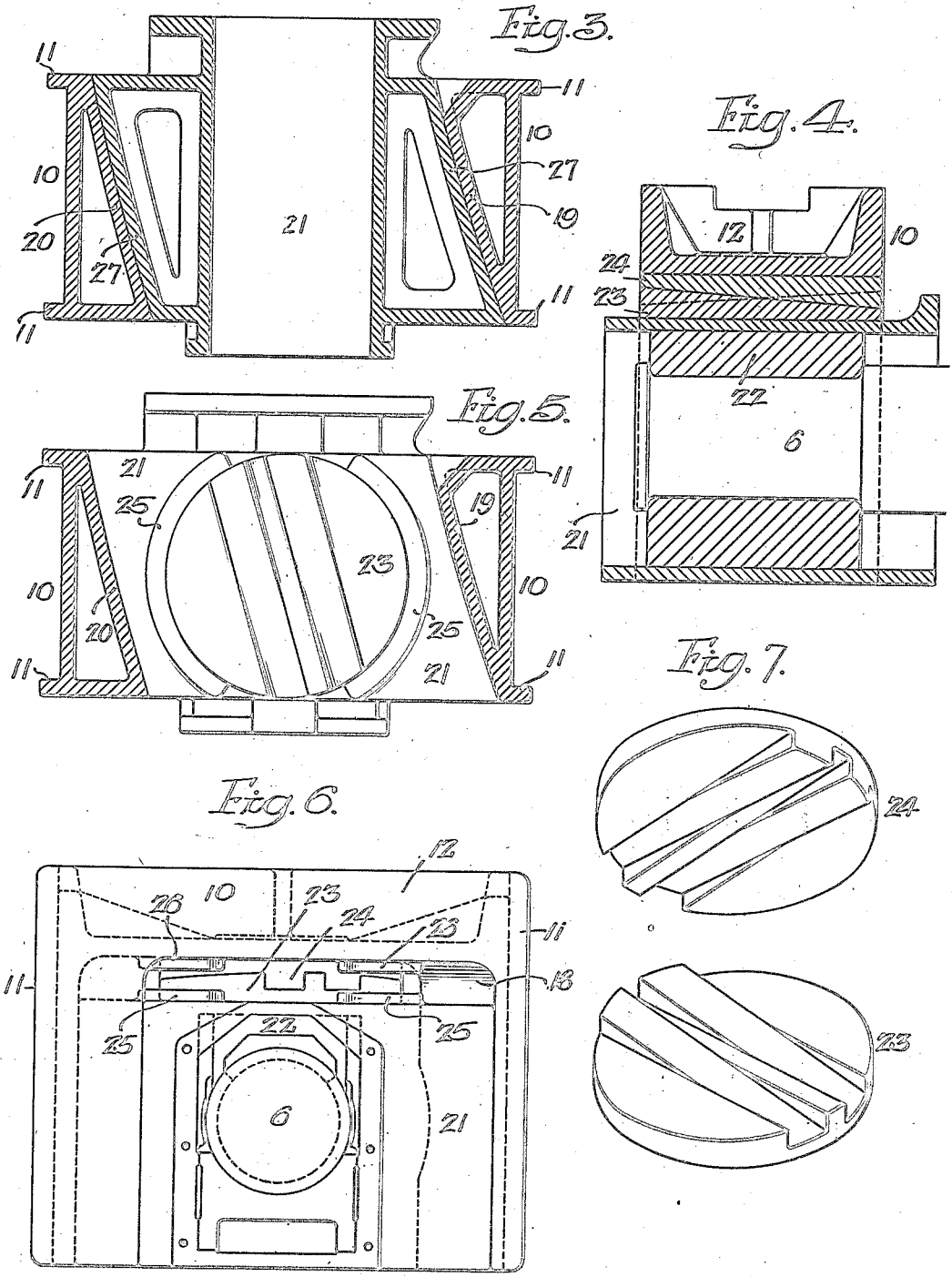

UNITED STATES PATENT OFFICE.

GEORGE R. HENDERSON, OF PHILADELPHIA, PENNSYLVANIA, ASSIGNOR TO THE BALDWIN LOCOMOTIVE WORKS, OF PHILADELPHIA, PENNSYLVANIA, A CORPORATION OF PENNSYLVANIA.

RADIAL TRUCK.

1,104,667.

Specification of Letters Patent.   Patented July 21, 1914.

Application filed June 17, 1913.   Serial No. 774,141.

*To all whom it may concern:*

Be it known that I, GEORGE R. HENDERSON, a citizen of the United States, residing in Philadelphia, Pennsylvania, have invented certain Improvements in Radial Trucks, of which the following is a specification.

My invention relates to certain improvements in radial trucks of the type particularly adapted for use as the rear trailing truck of a locomotive, but it will be understood that the invention can be applied to other rolling stock without departing from the spirit of the invention.

One object of my invention is to construct a radial truck so that the spring or equalizing bar will not move out of the vertical plane as the axle swings laterally in the frame.

A further object of the invention is to design the truck so that the box in which the axle is mounted will have a lateral movement, while the carrier, in which the box is mounted, will have a vertical movement. Consequently, the equalizing mechanism supported by the carrier will always remain in the same vertical plane irrespective of the lateral movement of the axle.

These objects I attain in the following manner, reference being had to the accompanying drawings, in which:—

Figure 1, is a plan view of the rear end of a locomotive frame illustrating my improved radial truck; Fig. 2, is a side view; Fig. 3, is a sectional plan view on the line *a—a*, Fig. 2, the axle being omitted; Fig. 4, is a sectional view on the line *b—b*, Fig. 1; Fig. 5, is a plan view with the carrier in section; Fig. 6, is a side view of a box and carrier; Fig. 7, is a detached perspective view of the two bearing disks; Fig. 8, is a sectional plan view illustrating a modification of the invention in which the boxes are located between the wheels; and Fig. 9, is a side view of the construction illustrated in Fig. 8.

Referring to Figs. 1 and 2, 1, 1 are the side frames of the locomotive, in the present instance connected to the casting 2 connected, in turn, to the extension frames 3 at the rear of the locomotive. These extension frames are connected by a rear casting 4 of any suitable type. 5, 5 are the rear driving wheels of the locomotive, and 6 is the axle of the rear radial truck. The truck, in the present instance, consists of a single axle, its boxes, and the carriers for the boxes. 7, 7 are the rear trailer wheels secured to the axle 6. In the type of locomotive illustrated in Figs. 1 and 2, the boxes are located outside of the wheels, while in the construction shown in Figs. 8 and 9, the boxes are located between the wheels and the main frame 1 can extend the entire length of the locomotive; whereas, in the construction illustrated in Fig. 1, the main frame stops at the casting 2 and the extension frames 3, 3 form a continuation of the main frame but are spaced a greater distance apart. Heretofore, in designing radial trucks of this general type, it has been customary to mount the equalizing springs or levers directly on the boxes and to provide means which will allow the springs to move laterally with the boxes and the axle. This construction is objectionable in many instances, because of the cost to manufacture and also because means must be provided to allow the springs or the equalizing bars to swing laterally with the truck. In a truck made in accordance with my invention, the springs do not move out of the vertical plane and, consequently, they can be coupled to the equalizing mechanism by the ordinary simple devices.

Formed on the extension 3 of the main frame are pedestals 8 connected together by the cap plate 9. Mounted to move vertically in the pedestals is a carrier 10 made as shown in the sectional view, Fig. 3, having a cross member and two vertical members provided with flanges 11 which overlap the pedestals 8. In the cross member is a cavity 12 in which rests the spring 13 in the present instance, which forms the cross bar or lever of the equalizing mechanism. This spring is connected by a link 14 to the pivot 15 of the frame 3, and is connected by a link 16 to the equalizing lever 17 pivoted to the frame 2 and connected, in the present instance, to the rear terminal of the main equalizing gear. This construction is duplicated on the opposite side of the locomotive.

In each carrier 10 is a recess 18 having its walls 19 and 20 curved on a radius, as indicated by dotted lines at *x*, Fig. 1; the center, in the present instance, being some distance in front of the rear driving wheels of the locomotive. The center, however, may be shifted, depending upon the length of the locomotive and the character of the track over which the locomotive will travel.

21. Fig. 5, is the axle box in which are the bearings 22 for the axle 6. The side walls 27 of each box 21 are curved on the same radial line as the inner walls 19 and 20 of the carriers, so that they will freely move in a radius in the carrier.

I preferably locate two bearing disks 23 and 24 between the upper surface of the box 21 and the carrier 10. These disks are made as shown in Fig. 7, having inclined ribs and grooves which interlock and form inclined bearings for the carrier, tending to bring the two parts to the normal central position. On the upper surface of the box 21 are segmental ribs 25 confining the disk 23, and on the carrier 10 are similar ribs 26 confining the disk 24, so that while they are free to turn they are held otherwise in position.

Instead of the disks shown in Figs. 1 to 7 of the drawings, rollers 28 may be located between the top surface of the box 21ª and the carrier 10ª, Figs. 8 and 9. The rollers in this instance have teeth which mesh with the teeth on the racks 29 and 30 on the boxes and carriers, respectively. In these figures, the boxes and carriers are slightly modified and are located in pedestals 8ª depending from the main frame 1ª, which extends the full length of the locomotive. In this instance, an equalizing bar 13ª rests on the carriers instead of a spring and this bar is not moved laterally out of the horizontal plane.

Thus it will be seen by the above construction, that I can dispense with the radial frame usually employed and can mount the boxes for the axles so that they have a radial movement laterally in the carriers, which are confined against lateral movement and only have a vertical movement in the pedestals of the main frame or an extension of the main frame, so that the springs or equalizing bars resting on the carriers will remain at all times in the same horizontal plane.

I claim:—

1. The combination in a radial truck, of a frame having pedestals on each side; a carrier mounted in each pedestal so as to move vertically, each carrier having a cross member and two vertical members forming a recess; an independent box mounted in the recess of each carrier; an axle mounted in the boxes; and a bearing between each box and the cross member of its carrier.

2. The combination of an axle; wheels thereon, said axle extending beyond the wheels; an independent box in which each extension of the axle is mounted; side frames located beyond the wheels; pedestals in each side frame; a carrier located between the pedestals of each side frame; means for preventing the carriers moving laterally, said carriers having curved recesses adapted to receive the boxes above mentioned; and an equalizing element resting on each carrier.

3. The combination of two side frames of a locomotive, pedestals projecting from each side frame; an independent carrier located between the pedestals of each side frame, each carrier having a recess therein; two independent boxes, one box mounted in the recess in one carrier and the other box mounted in the recess in the other carrier and having walls corresponding to the curves of the walls of the other carrier; a bearing in each box; an axle extending into each box; wheels on the axles located between the boxes and between the side frames of the locomotive; a spring located on the outside of each frame, each spring resting on a carrier; a link connecting each spring to the frame at one end; equalizing mechanism; and a link connecting each spring with said mechanism.

4. The combination of two side frames, having pedestals; a carrier mounted between the pedestals of each side frame; a box mounted in each carrier so as to move laterally; an axle adapted to the boxes; two disks located between the upper portion of each box and the carrier, each disk having ribs and grooves interlocking with those of the other disk.

5. The combination of two side frames, having pedestals; a carrier mounted between the pedestals of each frame; a box mounted in each carrier, the side walls of the boxes and the walls of the carriers being curved; a segmental flange on the upper surface of each box and on each carrier; two disks having interlocking inclined ribs and grooves, one disk being confined against movement, other than rotary, to the box, and the other disk confined to the carrier; an axle mounted in the boxes; and wheels on the axle.

In testimony whereof, I have signed my name to this specification, in the presence of two subscribing witnesses.

GEORGE R. HENDERSON.

Witnesses:
J. H. KORST,
LOUIS H. BENDER.